US010632956B2

(12) United States Patent
Schneider (10) Patent No.: US 10,632,956 B2
(45) Date of Patent: Apr. 28, 2020

(54) INFLATABLE SAFETY RESTRAINT SYSTEM FOR PROTECTING A REAR SEAT OCCUPANT

(71) Applicant: AUTOLIV ASP, INC., Ogden, UT (US)

(72) Inventor: David W. Schneider, Waterford, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 115 days.

(21) Appl. No.: 15/914,473

(22) Filed: Mar. 7, 2018

(65) Prior Publication Data

US 2018/0319358 A1 Nov. 8, 2018

Related U.S. Application Data

(60) Provisional application No. 62/500,646, filed on May 3, 2017.

(51) Int. Cl.
| | |
|---|---|
| *B60R 21/233* | (2006.01) |
| *B60R 21/207* | (2006.01) |
| *B60R 21/2338* | (2011.01) |
| *B60R 21/231* | (2011.01) |

(52) U.S. Cl.
CPC .......... *B60R 21/233* (2013.01); *B60R 21/207* (2013.01); *B60R 21/231* (2013.01); *B60R 21/2338* (2013.01); *B60R 2021/23153* (2013.01); *B60R 2021/23161* (2013.01); *B60R 2021/23308* (2013.01); *B60R 2021/23382* (2013.01); *B60R 2021/23386* (2013.01)

(58) Field of Classification Search
CPC ........... B60R 2021/23153; B60R 2021/23161; B60R 2021/23308; B60R 2021/23316; B60R 2021/23382; B60R 2021/23386; B60R 21/207; B60R 21/233; B60R 21/2338; B60R 21/231
See application file for complete search history.

(56) References Cited

U.S. PATENT DOCUMENTS

| | | | | |
|---|---|---|---|---|
| 5,738,368 A | * | 4/1998 | Hammond | ............... B60N 2/68 280/730.1 |
| 7,195,276 B2 | * | 3/2007 | Higuchi | ............... B60R 21/231 280/729 |
| 7,926,840 B1 | * | 4/2011 | Choi | ..................... B60R 21/214 280/730.1 |

(Continued)

*Primary Examiner* — Laura Freedman
(74) *Attorney, Agent, or Firm* — Stephen T. Olson; Harness, Dickey & Pierce, P.L.C.

(57) ABSTRACT

A vehicle seat includes a seatback and an airbag unit. The seatback has a front side and a rear side. The airbag unit includes an airbag and an inflator. The airbag unit is carried by the seatback and includes a first portion and a second portion. In an inflated state free of outside forces, the airbag rearwardly extends from the rear side of the seatback such that the first portion includes a first impact surface defining a first impact plane and the second portion includes a second impact surface defining a second impact plane. The first impact plane is oriented generally vertical and the second impact plane oriented generally horizontal. At least one shape defining member may be provided for maintaining the generally horizontal orientation of the second impact plane.

16 Claims, 7 Drawing Sheets

(56) References Cited

U.S. PATENT DOCUMENTS

| | | | | |
|---|---|---|---|---|
| 7,997,615 | B2* | 8/2011 | Jang | B60R 21/231 |
| | | | | 280/730.1 |
| 8,002,309 | B2* | 8/2011 | Kim | B60R 21/214 |
| | | | | 280/729 |
| 8,393,637 | B2* | 3/2013 | Choi | B60R 21/214 |
| | | | | 280/730.1 |
| 8,398,113 | B2* | 3/2013 | Choi | B60R 21/207 |
| | | | | 280/730.1 |
| 8,403,358 | B2* | 3/2013 | Choi | B60R 21/214 |
| | | | | 280/728.2 |
| 8,622,417 | B1* | 1/2014 | Schneider | B60R 21/2338 |
| | | | | 280/729 |
| 9,308,883 | B1* | 4/2016 | Schneider | B60R 21/231 |
| 9,321,423 | B2* | 4/2016 | Jaradi | B60R 21/015 |
| 9,352,839 | B2* | 5/2016 | Gehret | B60R 21/207 |
| 9,446,733 | B2* | 9/2016 | Pausch | B60R 21/231 |
| 9,707,921 | B2* | 7/2017 | Fischer | B60R 21/231 |
| 9,827,939 | B1* | 11/2017 | Roychoudhury | B60R 21/239 |
| 9,896,056 | B2* | 2/2018 | Burczyk | B60R 21/231 |
| 10,035,484 | B2* | 7/2018 | Jaradi | B60R 21/207 |
| 10,272,868 | B2* | 4/2019 | Jaradi | B60R 21/214 |
| 10,279,770 | B2* | 5/2019 | Faruque | B60R 21/0136 |
| 2009/0001695 | A1* | 1/2009 | Suzuki | B60R 21/231 |
| | | | | 280/730.2 |
| 2013/0341975 | A1* | 12/2013 | Schneider | B64D 11/06 |
| | | | | 297/163 |
| 2017/0210329 | A1* | 7/2017 | Rao | B60R 21/0136 |
| 2017/0291566 | A1* | 10/2017 | Karlow | B60R 21/276 |

* cited by examiner

INFLATABLE SAFETY RESTRAINT SYSTEM FOR PROTECTING A REAR SEAT OCCUPANT

CROSS-REFERENCE TO RELATED APPLICATIONS

This application claims priority to U.S. Provisional Application No. 62/500,646 filed 3 May 2017. The entire disclosure of this application is incorporated herein by reference.

FIELD

The present disclosure generally relates to occupant safety restraint systems. More particularly, the present disclosure relates to an inflatable safety restraint system for protecting a rear seat occupant.

BACKGROUND

This section provides background information related to the present disclosure which is not necessarily prior art.

Various passive and active occupant restraint systems are known for enhancing occupant protection in the event of a pending or actual vehicle impact. Passive systems are deployed with no action required by the occupant. For example, the use of frontal airbags protecting a vehicle occupant in the event a frontal crash or a laterally offset frontal crash is common in modern automotive technology. The frontal airbag for the driver is usually located in the hub area of the steering wheel and the frontal airbag for the front seated passenger is usually located inside the instrument panel.

Figures 1, 2, 3:
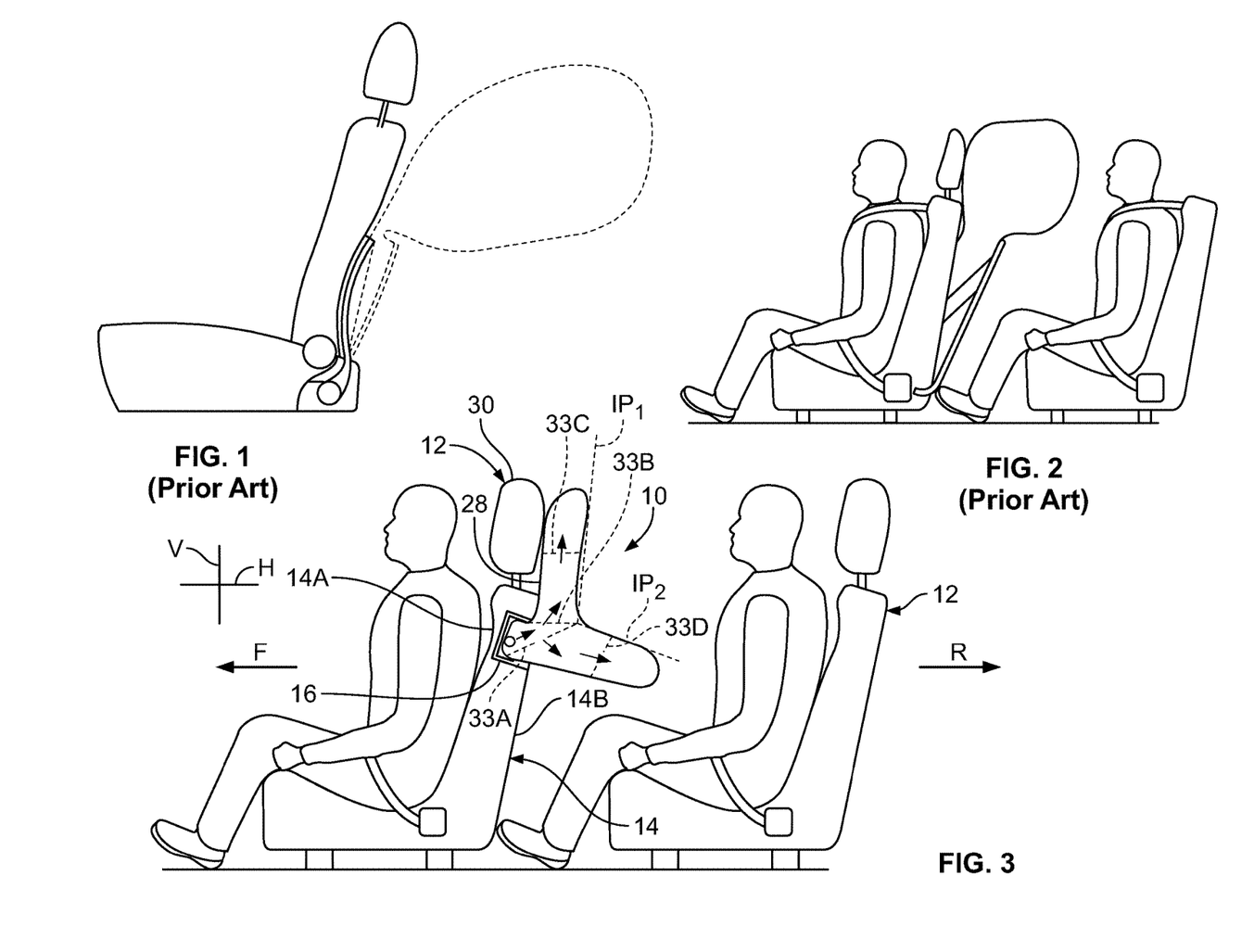
FIGS. 1 and 2 are examples of airbags mounted to a seatback of a vehicle seat for protecting a rear seat occupant consistent with the prior art.
FIG. 3 is a simplified side view of a portion of an exemplary vehicle incorporating an inflatable safety restraint system in accordance with the present teachings, the inflatable safety restraint system including an airbag mounted to a seatback of a forward vehicle seat and operative to protect an occupant in a rear seat, the airbag shown immediately after deployment and free of outside forces.

For many years, attempts have been made to adapt frontal airbag technologies into the rear side of a front seat in order to provide enhanced protection for a rear seated occupant. Examples consistent with the prior art are shown in FIGS. 1 and 2. As illustrated in both examples, a front vehicle seat is shown operatively associated with an airbag module at a rear side of a backrest of a front seat. The deployed airbag basically extends rearwards (in regards to the vehicle direction) and upwards from its connection to the backrest.

While known inflatable restraint systems may have proven to be generally acceptable for their intended purposes, prior art systems for rear seat occupant protection are associated with disadvantages. In this regard, airbags for these known systems have relatively large cushion volumes, require more inflation gas to fill, and may require more packaging space. Due to the relatively large cushion size, such airbags may require inflators with faster rise rates. Additionally, these airbags may not best accommodate rear-facing child seats.

Despite the advancements provided by known inflatable restraint systems, it remains desirable to advance the relevant art by further enhancing rear occupant protection.

SUMMARY

This section provides a general summary of the disclosure, and is not a comprehensive disclosure of its full scope or all of its features.

It is one general objection of the present teachings to provide an inflatable occupant restraint system for a seatback-mounted airbag for rear seat occupant restraint and head protection. The addition of the airbag for protecting the rear seat occupant also enables the use of seat belts with lower load limit levels. The airbag may be mounted to the front seatback structure, or to the back of a second row or additional seat rows for vehicles with multiple row seating such as vans, buses, aircraft, or other transportation vehicles. The airbag may provide restraint for both belted and unbelted occupants.

In accordance with one particular aspect, the present teachings provide a vehicle seat including a seatback and an airbag unit. The seatback has having a front side and a rear side. The airbag unit includes an airbag and an inflator. The airbag unit is carried by the seatback and includes a first portion and a second portion. In an inflated state free of outside forces, the airbag rearwardly extends from the rear side of the seatback such that the first portion includes a first impact surface defining a first impact plane and the second portion includes a second impact surface defining a second impact plane. The first impact plane is oriented generally vertical and the second impact plane oriented generally horizontal. The airbag additionally includes at least one shape defining member for maintaining the generally horizontal orientation of the second impact plane.

In accordance with another particular aspect, the present teachings provide a safety restraint system for a vehicle seat having a seatback. The safety restraint system includes an inflator and an L-shaped airbag. The L-shaped airbag includes a first leg and a second leg. The first leg includes a first impact surface and an opposite, forward facing surface, the second leg includes a second impact surface and an opposite, downward facing surface. When the airbag is fully inflated and without any outside forces acting thereon, the first and second impact surfaces define first and second impact planes, respectively. The first impact plane is oriented generally vertical and the second impact plane is oriented generally horizontal.

In accordance with yet another particular aspect, the present teachings provide an airbag for protecting an occupant of a rear seat of a motor vehicle. The airbag includes a first portion having a first impact surface and a second portion having a second impact surface. In an inflated state of the airbag free of outside forces, the first and second impact surfaces define first and second impact planes, respectively. The first and second impact planes enclose an angle between 60° and 120°.

In accordance with still yet another particular aspect, the present teachings provide a method of protecting an occupant of a rear seat of a motor vehicle with an airbag having first and second portions with first and second impact surfaces, respectively. The method includes mounting the airbag to a rear side of a seatback of a vehicle seat. The method additionally includes inflating the airbag such that when the airbag is in a fully inflated state free of outside forces, the first impact surface and the second impact surface define first and second impact planes, respectively. The first and second impact planes enclose an angle between 60° and 120°. The second portion is unsupported in a vertical direction by any vehicle structure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiment should not be construed to limit the scope of the present disclosure. Well-known processes, well-known device structures, and well-known technologies are not described herein in detail.

With initial reference to FIGS. 3 through 7, an inflatable safety restraint system constructed in accordance with the present teachings is illustrated and generally identified at reference character 10. In the environmental view of FIG. 3, the inflatable restraint system 10 is shown operatively associated with a front or forward seat 12 of a motor vehicle. The vehicle seat 12 conventionally includes a seatback 14 having a front side 14A and a rear side 14B. It will be understood that the particular seat 12 illustrated is merely exemplary. In this regard, the present teachings may be adapted to various other seats within the scope of the present teachings.

The inflatable safety restraint system 10 generally includes a housing 16 which is part of an airbag unit 18. The housing 16 is located in or at the rear side 14B of the seatback 14. The airbag unit 18 further includes an inflator 20 and an airbag 22. The inflator 20 may be in the form of a gas generator, for example. The airbag 22 has an outer skin and may also comprise one or more tethers for shaping the outer skin upon deployment. The outer skin may be attached directly or indirectly to the seatback 14, for example to the frame of the seatback 14.

The airbag 22 may be of a multiple-piece construction with side panels to create a desired shape or profile, or alternatively may be a 2-panel or single panel "pillow" type construction which uses a combination of pleats, internal tethers, external tethers, and/or non-inflated regions to create the desired shape. The fabric of the airbag 22 may be include OPW (one-piece woven), including internal woven-in-tethers and non-inflated areas (zero length tethers) to control cushion geometry and reduce complexity/cost. The airbag 22 may be normally stored within the housing 16. In this regard, the airbag 22 may be roll-folded, z-folded or otherwise stored in the housing 16.

In FIG. 3, for example, the airbag 22 is shown in an inflated or fully deployed state free of outside forces. Explaining further, the airbag 22 is shown in this view before the occupant encounters the airbag 22. The seatback 14 of the vehicle seat 12 is shown throughout the drawings within a standard inclination range between 15° and 45°. The term "fully inflated" may be used herein to reference the state of the airbag when it is deployed and free of outside forces. For reference, the forward and rearward vehicle directions are shown in the drawings at arrow F and arrow R (see FIG. 3), respectively. Vertical and horizontal reference planes are identified at reference characters V and H, respectively (e.g., extending into the page in FIG. 3). As used herein, the term "rearward" will be understood to be rearward relative to the vehicle or in the direction of arrow R.

The fully inflated airbag is shown to generally include a first portion 22A and a second portion 22B. The first portion 22A includes a first impact surface 24. The first impact surface 24 defines a first impact plane $IP_1$ (see FIG. 3). The first impact plane $IP_1$ is upwardly facing and oriented generally vertical. As used herein, the term "generally vertical" shall mean that the first impact plane $IP_1$ is oriented closer to the vertical reference plane V than the horizontal reference plane H. Explaining further, the first impact plane $IP_1$ and the vertical reference plane V enclose an angle between 0° and 45°. In certain applications, the first impact plane $IP_1$ and the vertical reference plane V enclose an angle no greater than 30°.

The second portion 22B of the fully inflated airbag 22 includes a second impact surface 26. The second impact surface 26 is upwardly facing and defines a second impact plane $IP_2$ (see FIG. 3). The second impact plane $IP_2$ is oriented generally horizontal. As used herein, the term "generally horizontal" shall mean that the second impact plane $IP_2$ is oriented closer to the horizontal reference plane H than the vertical reference plane V. Explaining further, the second impact plane $IP_2$ and the horizontal reference plane H enclose an angle between 0° and 45°. In certain applications, the second impact plane $IP_2$ and the horizontal reference plane H enclose an angle no greater than 30°. In certain applications, the first and second impact planes $IP_1$ and $IP_2$ enclose an angle between 60° and 120°.

In the embodiment illustrated, the first portion 22A upwardly extends from the second portion 22B. Explaining further, the first portion 22A extends rearwardly and upwardly from the seat 12 upon deployment. As such, the first and second portions define first and second legs, respectively, of an L-shape. The first portion 22A of the airbag 22 has a first depth $D_1$ (see FIG. 7) perpendicular to the first impact plane $IP_1$ that extends from the first impact surface 24 to an opposite side, or forward facing side 28 of the first portion 22A. As shown in the drawings, the forward facing side 28 of the first portion 22A may be disposed, upon inflation of the airbag 22 adjacent a rear side of the seat 12. More specifically, an upper portion of the forward facing side 28 of the first portion 22A may be disposed immediately adjacent a headrest 30 of the seat 12. The forward facing side or surface 28 of the first portion 22A is generally parallel to the first impact surface 24. As used here, the term "generally parallel" shall mean that the surfaces enclose an angle of no more than 15 degrees, preferably no more than 10 degrees, and more preferably no more than 5 degrees. In this manner, the first portion 22A defines a reduced profile.

The second portion 22B of the airbag 22 has a second depth $D_2$ rearwardly extending from the first impact plane $IP_1$. The second depth $D_2$ also extends parallel to the second impact plane $IP_2$. The second depth $D_2$ extends from an intersection 31 between the first and second portions 22A and 22B of the airbag 22 to a rearmost end 32 of the second portion 22B. As illustrated, the second depth $D_2$ is greater than the first depth $D_1$. In certain embodiments, the second depth $D_2$ may be twice as great as the first depth $D_1$.

The second portion 22B has a second height H2 extending from the second impact surface 26 to a downwardly facing side or surface 29. The downwardly facing side 29 may be generally parallel the second impact surface 26. Similar to the first portion 22A, the generally parallel sides of the second portion 22B define a reduced profile for the second portion 22B.

The airbag 22 may include at least one shape defining member for maintaining the generally horizontal orientation of the second impact plane and/or to otherwise maintain a desired shape upon inflation. For example, the airbag 22 may include one or more internal tethers 33 having a first end sewn or otherwise suitable attached to the outer skin of the airbag 22 proximate the intersection 31 between the first and second portions 22A and 22B of the airbag 22 and a second end sewn or otherwise suitable attached proximate the housing 16. In this regard, the second ends of the tethers 33 may be attached to the skin of the airbag 22 or to a rigid or semi-rigid structure adjacent the inflator (such as inflator bracket, airbag housing or seat frame). In the embodiment illustrated, the airbag 22 includes first and second tethers 33A and 33B. The first tether 33A has a first end sewn or otherwise suitable attached to the outer skin of the airbag 22 proximate the intersection 31 and a second end sewn or otherwise suitable attached proximate the housing 16 (as discussed above) and below the inflator 20. The second tether 33B similarly has a first end sewn or otherwise suitable attached to the outer skin of the airbag 22 proximate the intersection 31 and a second end sewn or otherwise suitable attached proximate the housing 16 (as discussed above) and above the inflator 20.

The airbag 22 may include additional internal tethers 33C and 33D, for example. The third tether 33C may control the depth $D_1$ of the first portion 22A of the airbag 22. Similarly, the fourth internal tether 33D may control the height $H_2$ of the second portion 22B of the airbag 22. As illustrated, the third and fourth tethers 33C and 33D may aid in defining the first and second portions 22A and 22B of the airbag 22 to include generally parallel sides. As such, a reduced inflated profile of the airbag 22 may be provided between the occupant and the seatback 14 and between the occupant and his legs.

The tethers 33 may provide a more rigid connection between the first and second portions 22A and 22B of the airbag 22 for maintaining a desired orientation of the first and second portions 22A and 22B even when the second portion 22B is encountered by the occupant. Explaining further, the internal tethers 33 allow the second portion 22B of the airbag 22 to be unsupported in a vertical direction. In this regard, the horizontally extending second portion 22B does not rely on support from any vehicle structure. In use, the second portion 22B may be supported or opposed by the occupant's legs. The internal tethers 33 may further allow a gas fill throat of the airbag 22 to maintain a larger volume for airbag inflation, provide stability of the airbag 22 against the seatback 14, and control thickness of the airbag 22.

In the embodiment illustrated the throat of the airbag 22 leads directly to both the first and second portions 22A and 22B for more effectively and simultaneously inflating the first and second portions 22A and 22B. As a result, less force in a single direction may be required since the inflation gases are simultaneously directed to the first and second portions 22A and 22B. Additionally, filling of the airbag 22 may be faster. Further, a shorter length throat may use less fabric and result in a smaller folded package.

The tethers 33 may extend laterally across the airbag 22 and may include different internal venting so that an amount and flow rate of inflation gas directed to the first portion 22A of the airbag 22 may be different that the amount of gas and flow rate of inflation gas directed to the second portion 22B of the airbag 22. The different internal venting may be controlled by hole quantity, hole diameter and placement of the holes within the tethers 33, for example. Different fill rates for the first and second portions 22A and 22B may be desirable to address both in-position and out-of-position conditions of the occupant. The internal tethers 33 may be defined by multiple straps or by panel-type tethers sewn along the width (e.g., cross-car, lateral direction).

In one particular application, the airbag 22 is intended to extend substantially across a single seat 12 in a cross-car direction and has width W in a lateral direction of approximately 40 cm, a first depth $D_1$ of approximately 10 cm, a second depth $D_2$ of approximately 30 and a height $H_1$ of approximately 45 cm. In this particular application, the airbag 22 may have a volume between approximately 30 L and 40 L. It will be understood that these dimensions are exemplary and may be modified within the scope of the present teachings. It will also be understood that the width W may be increased to adapt the present teachings to protect multiple rear seat occupants.

Figure 7:
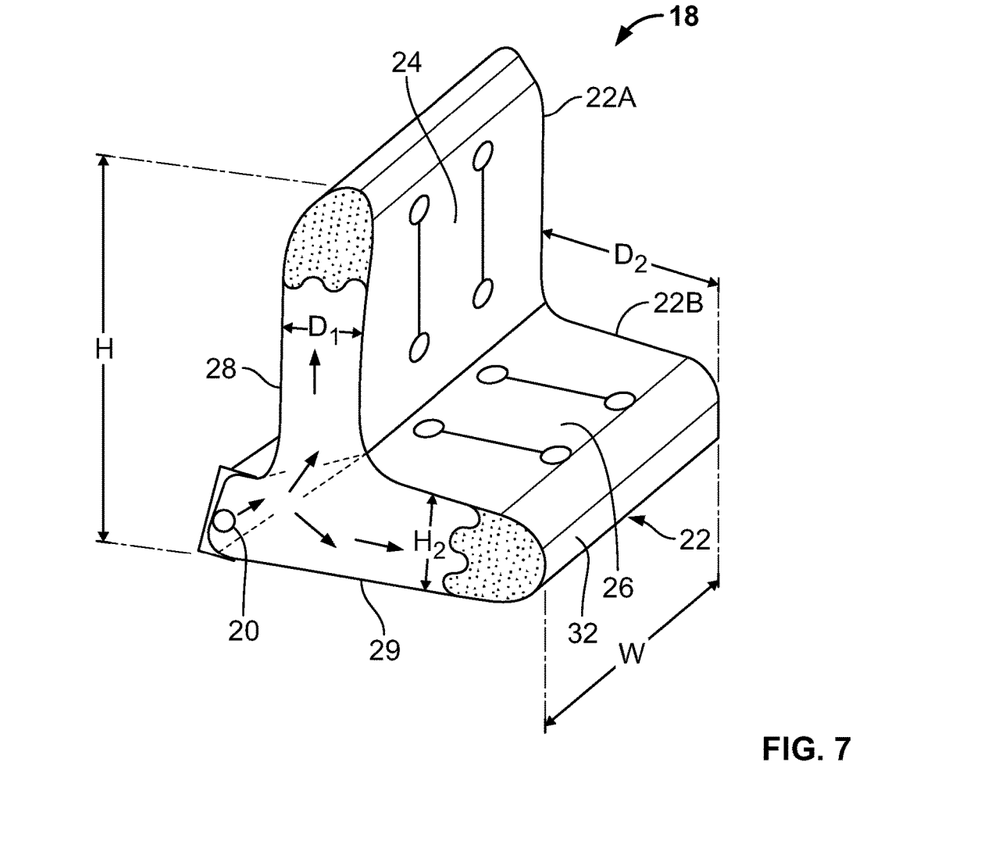
FIG. 7 is a perspective view of an airbag unit of the inflatable safety restraint system of the present teachings.

As shown in FIG. 7, for example, the airbag 22 may additionally or alternatively include zero-length tethers to aid in defining a desired shape of the airbag 22. Such tethers will be understood to be conventional insofar as the present teachings are concerned. As will be discussed below, the airbag 22 may additionally or alternatively include external tethers, or other structure for controlling shape.

A method of protecting a rear seat occupant with the system 10 will be described with continued reference to FIGS. 3-6. A vehicle restraint system controller (not shown) may automatically send signals to actuate the inflator 20 to inflate the airbag 22. Details of the inflator 20 and the vehicle restraint system controller are beyond the scope of the present teachings and will be readily apparent to those of ordinary skill in the art.

Due to a reduced volume (as compared to prior art airbags for rear occupant protection), the airbag 22 may be quickly inflated to its fully inflated state, as shown in FIG. 3. Inflation gases from the inflator 20 simultaneously fill the first portion 22A and the second portion 22B. In this inflated state of the airbag 22 free of outside forces, the first portion 22A is oriented generally vertical. Similarly, the first impact surface 24, the first impact plane $IP_1$ defined by the first impact surface 24, and the forward facing surface 28 are oriented generally vertical. Further in this inflated state of the airbag 22, the second portion 22B is oriented generally horizontal. Similarly, the second impact surface 26, the second impact plane $IP_2$ defined by the second impact surface 26, and the downward facing surface are oriented generally horizontal. The second portion 22B is partially disposed above knees of the occupant of the rear seat.

Figure 4:
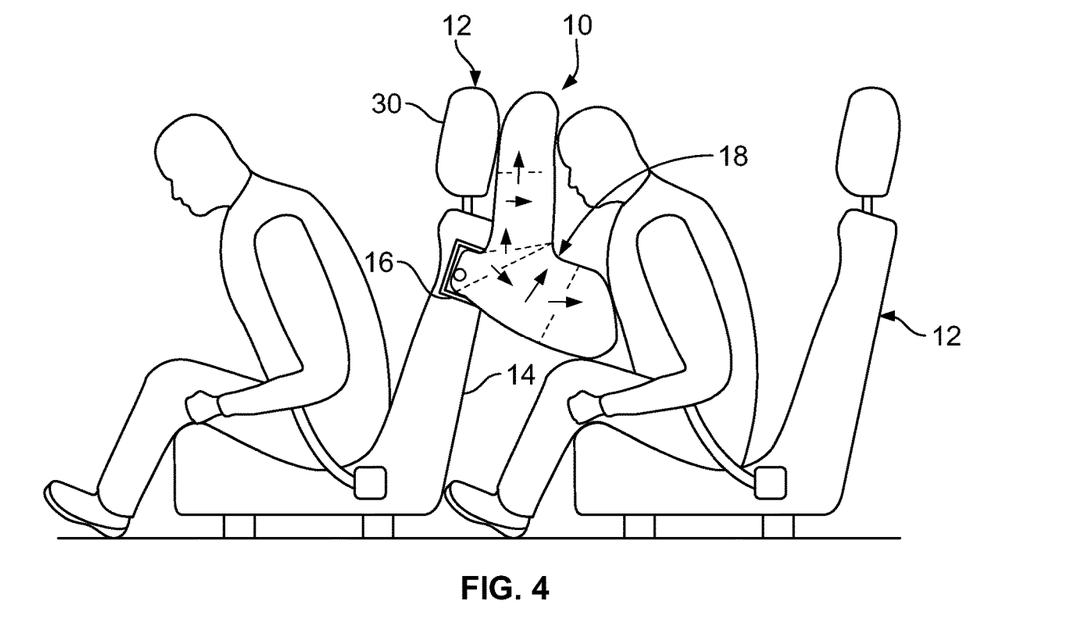
FIG. 4 is a simplified side view of the exemplary vehicle of FIG. 3 shown with the airbag of the inflatable safety restraint system of the present teachings deployed, the rear seat in a forward position and the occupants of the vehicle reacting to a vehicle accident condition.

FIG. 4 illustrates a situation in which the airbag 22 of the inflatable safety restraint system 10 is deployed and the rear seat is in a forward position or there is otherwise limited space between the occupant of the rear seat and the forward seat 12. FIG. 4 further illustrates the occupants of the vehicle reacting to a vehicle accident condition (e.g., a collision or pending collision). The airbag 22 may be quickly and fully inflated prior to being encountered by the occupant. The first portion 22A of the airbag 22 may deploy immediately adjacent the headrest 30 of the seat 12 and may prevent the occupant from engaging the forward seat 12. The second portion 22B of the airbag 22 may engage the chest of the occupant, thereby preventing the occupant from forward movement and/or reducing seatbelt forces on the occupant.

Figure 5:
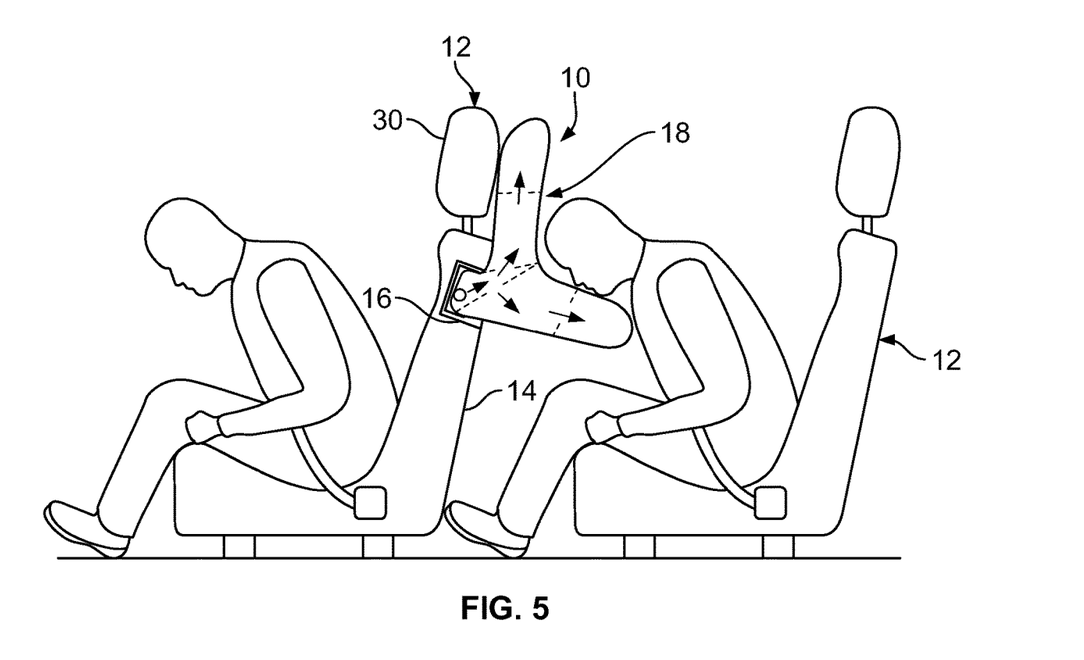
FIG. 5 is another simplified side similar to FIG. 3 shown with the airbag of the inflatable safety restraint system of the present teachings deployed, the rear seat shown in a rearward position and the occupants of the vehicle reacting to a vehicle accident condition.

FIG. 5 illustrates a situation in which the airbag 22 of the inflatable safety restraint system 10 is deployed and the rear seat 12 is in a rearward position or there is otherwise further space between the occupant of the rear seat 12 and the forward seat 12 such that the occupant would not encounter the forward seat 12 if the airbag 22 was not present. FIG. 5 again further illustrates the occupants of the vehicle reacting to a vehicle accident condition. The first portion 22A of the airbag 22 again deploys immediately adjacent the headrest 30 of the seat 12. The second portion 22B of the airbag may prevent the head of the occupant from colliding with the knees.

Figure 6:
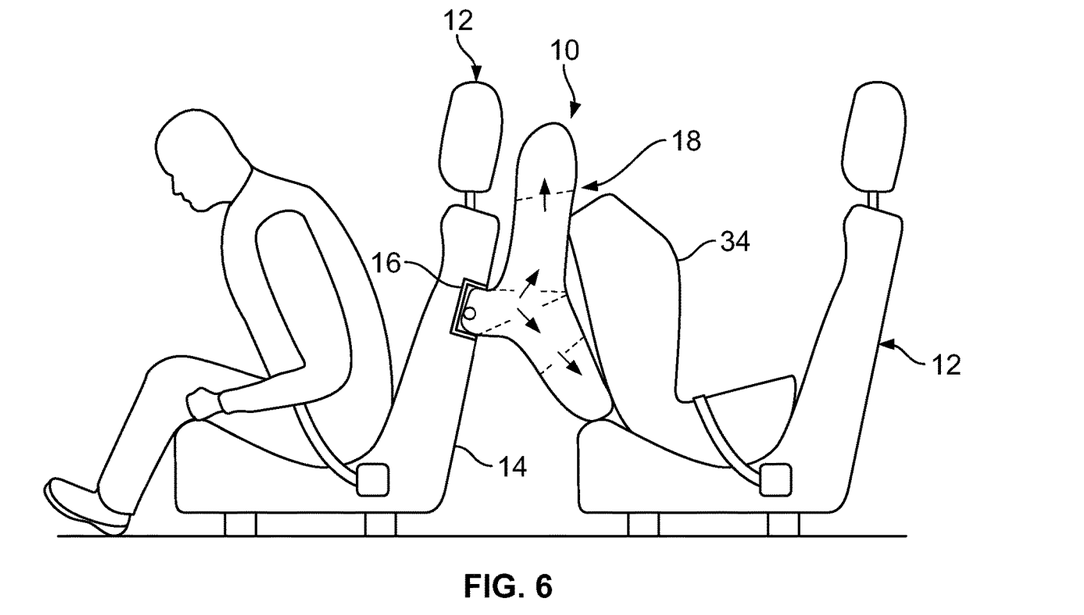
FIG. 6 is another simplified side view similar to FIG. 3 shown with the airbag of the inflatable safety restraint system of the present teachings deployed and a child seat provided on the rear seat.

FIG. 6 illustrates a situation in which the airbag 22 of the inflatable safety restraint system 10 is deployed and a rear-facing child seat 34 is carried on the rear seat 12. When the airbag 22 deploys and encounters the car seat 34, the second portion 22B of the airbag 22 is deflected downwardly. Explaining further, the angle enclosed by the first and second impact planes IP1 and IP2 may increase as a result of the airbag 22 encountering the car seat 34. Interaction between the car seat 34 and the airbag 22 is thereby reduced.

Figure 8:
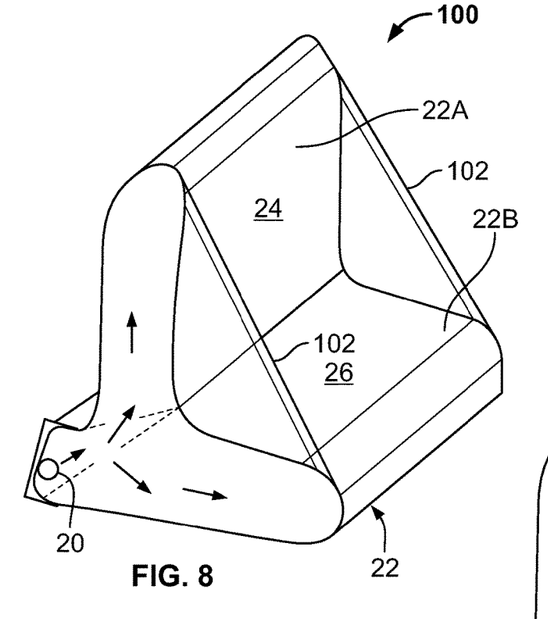
FIG. 8 is a perspective view of another airbag unit in accordance with the present teachings.

Turning to FIG. 8, another airbag unit in accordance with the present teachings is illustrated and generally identified at reference character 100. Given the similarities between the airbag unit 100 and the airbag unit 18, common reference characters will be used to identify similar elements. The airbag unit 100 differs from the airbag unit 10 in by incorporating external tethers 102 to further control geometry of the fully inflated airbag 22. As shown, the external tethers 102 may extend between an upper end of the first portion 22A and the rearmost end 32 of the second portion 22B, for example.

Figure 9:
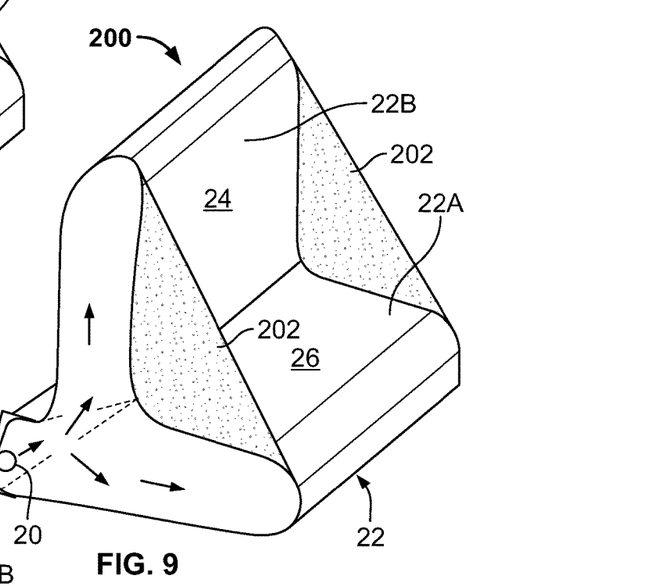
FIG. 9 is a perspective view of another airbag unit in accordance with the present teachings.

Turning to FIG. 9, another airbag unit in accordance with the present teachings is illustrated and generally identified at reference character 200. Given the similarities between the airbag unit 200 and the airbag unit 18, common reference characters will be used to identify similar elements. The airbag unit 200 differs from the airbag unit 18 by incorporating first and second panel tethers 202 to further control geometry of the fully inflated airbag 22. The first and second external panel tethers 202 interconnect the first and second portions 22A and 22B of the airbag 22. The first and second external panel tethers 202 may be triangular shaped, for example.

Figure 10:
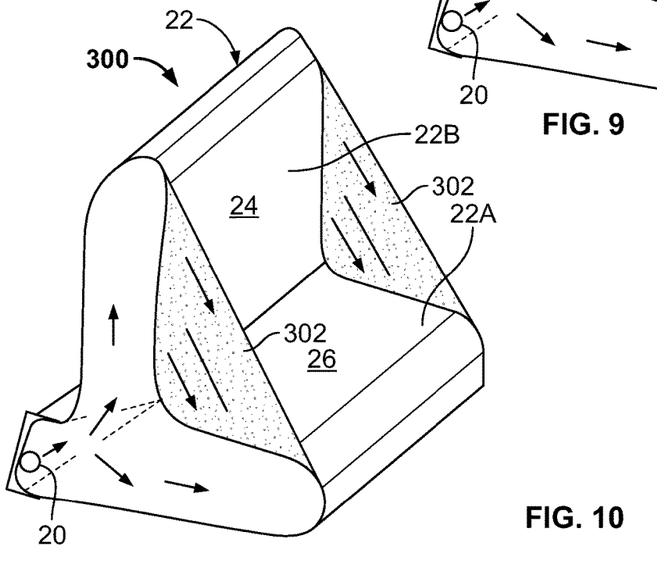
FIG. 10 is a perspective view of another airbag unit in accordance with the present teachings.

Turning to FIG. 10, another airbag unit in accordance with the present teachings is illustrated and generally identified at reference character 300. Given the similarities between the airbag unit 300 and the airbag unit 18, common reference characters will be used to identify similar elements. The airbag unit 300 differs from the airbag unit 18 by incorporating first and second inflatable, external panel tethers 302 to further control geometry of the fully inflated airbag 22. The first and second inflatable, external panel tethers 302 interconnect the first and second portions 22A and 22B of the airbag 22. The first and second inflatable, external panel tethers 302 may be triangular shaped, for example.

Figure 11:
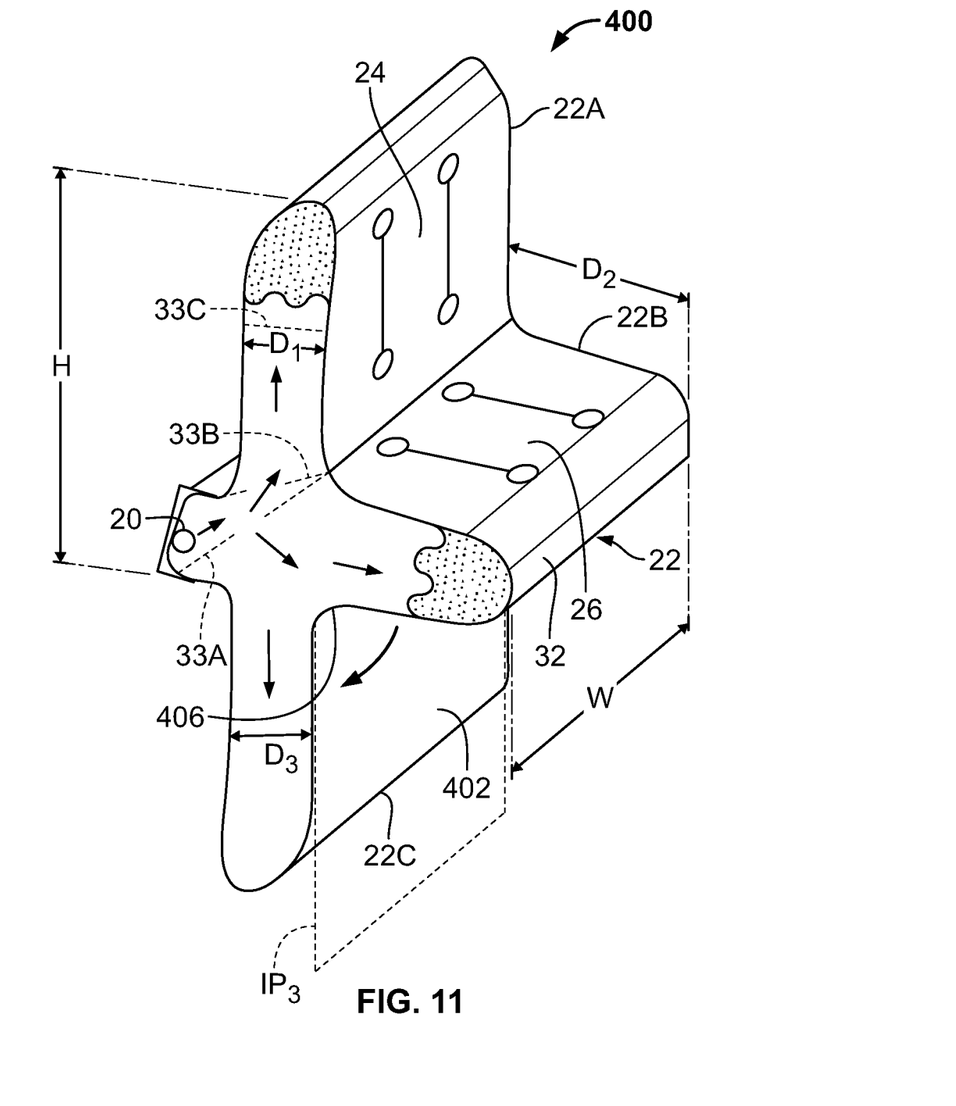
FIG. 11 is a perspective view of another airbag unit in accordance with the present teachings.
Figure 12A:
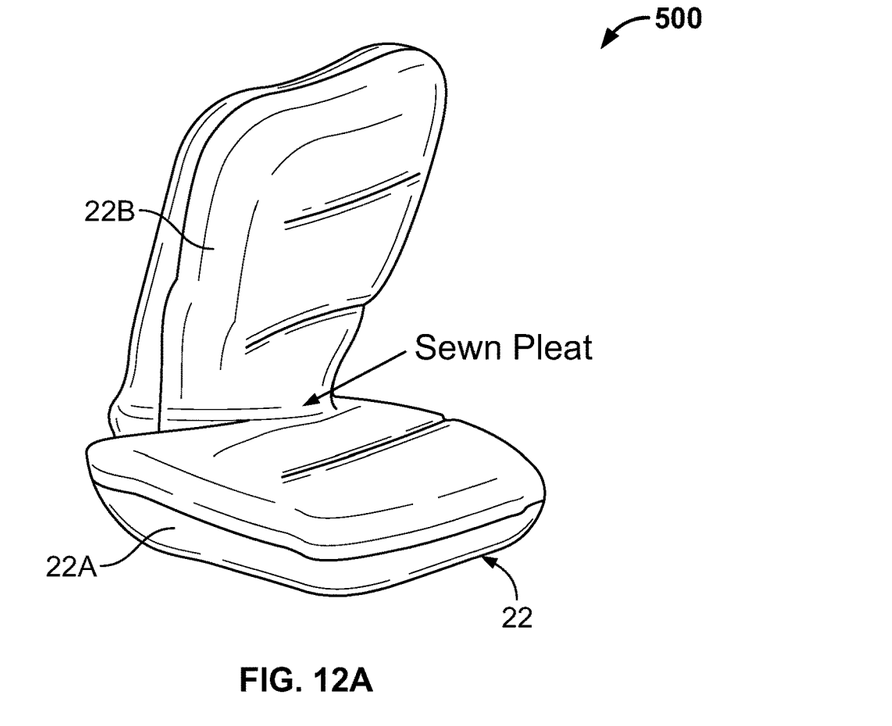
FIGS. 12A through 12D are a series of views illustrating another airbag unit in accordance with the present teachings, the airbag unit shown without the inflator.
Figure 12B:
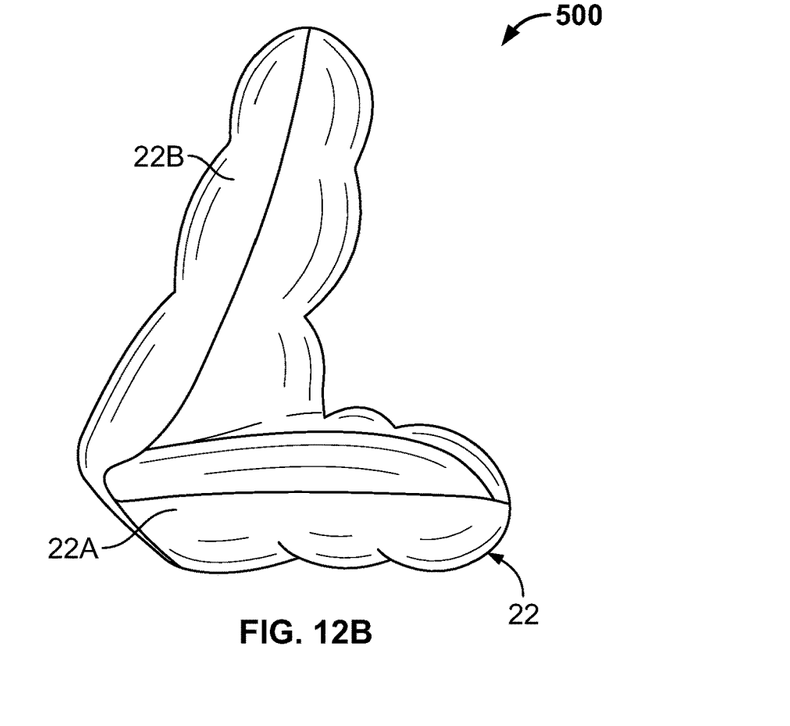
Figure 12C:
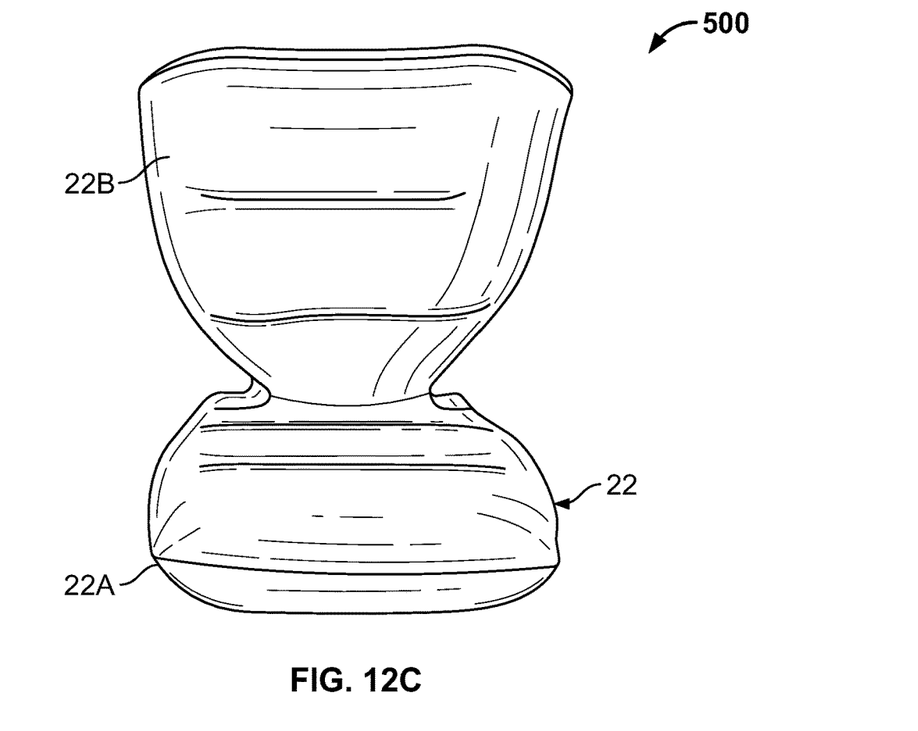
Figure 12D:
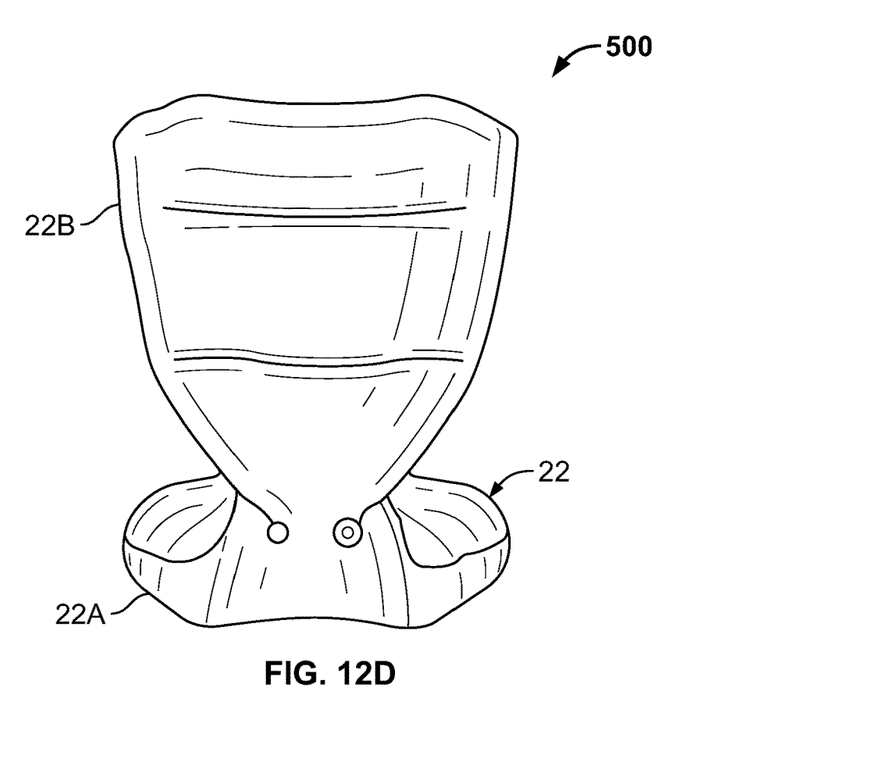

Turning to FIG. 11, another airbag unit in accordance with the present teachings is illustrated and generally identified at reference character 400. Given the similarities between the airbag unit 400 and the airbag unit 18, common reference characters will be used to identify similar elements. The airbag unit 400 differs from the airbag unit 10 by additionally incorporating a third portion 22C. The third portion 22C may include a third impact surface 402. When the airbag 22 is inflated and free of outside forces, the third impact surface 402 may define a third impact plane $IP_3$. The third impact plane $IP_3$ may be rearward facing and may be oriented generally vertical. The third portion 22C may cooperate with the first and second portions 22A and 22B to define a T-shape. The third portion 22C may have a third depth $D_3$ extending parallel to the third impact plane $IP_3$. The third depth $D_3$ downwardly extends from an intersection 406 between the first and second portions 22A and 22C of the airbag 22. It will be understood that the airbag 22 may include internal tethers extending from the intersection 406 to proximate the housing, similar to internal tethers 33A and 33B, and an internal tether controlling the shape and depth $D_3$ of the third portion, similar to internal tether 33C. It will be further understood that the airbag 22 may be alternatively constructed without the first portion 22A. In this regard, the airbag 22 may be L-shaped with two legs defined by the second and third portions 22B and 22C. The third portion 22C may further protect the knees of the occupant of the rear seat 12.

Turning to FIGS. 12A through 12D, another airbag unit in accordance with the present teachings is illustrated and generally identified at reference character 500. Given the similarities between the airbag unit 500 and the airbag unit 18, common reference characters will again be used to identify similar elements. The airbag unit 500 is shown in FIGS. 12A through 12D without the inflator 20. The airbag unit 500 differs from the airbag unit 10 by additionally incorporating a shape defining member in the form of a sewn pleat 502 to control an angle between the first and second portions 22A and 22B of the airbag 22. Additionally, the first portion 22A of the airbag 22 may taper from a maximum lateral width proximate an upper end thereof to a minimum lateral width proximate a lower end thereof.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. For example, where the present teachings are used in connection with a bench seat, a single airbag may extend across all seating positions and may be deployed by a single inflator.

What is claimed is:

1. A vehicle seat comprising:
   a seatback having a front side and a rear side;
   an airbag unit including an airbag and an inflator, the airbag unit carried by the seatback and including a first portion and a second portion, the airbag, in an inflated state free of outside forces, rearwardly extending from the rear side of the seatback such that the first portion includes a first impact surface defining a first impact plane and the second portion includes a second impact surface defining a second impact plane, the first impact plane oriented generally vertical and the second impact plane oriented generally horizontal; and
   at least one shape defining member for maintaining the generally horizontal orientation of the second impact plane,
   wherein the at least one shape defining member includes at least a first internal tether having a first end attached to a skin of the airbag proximate an intersection between the first and second impact surfaces and a second end attached proximate a housing.

2. The vehicle seat of claim 1, wherein the first impact plane and a vertical reference plane enclose a first angle between 0° and 45°.

3. The vehicle seat of claim 2, wherein the first angle is no greater than 30°.

4. The vehicle seat of claim 3, wherein the second impact plane and a horizontal reference plane enclose a second angle between 0° and 45°.

5. The vehicle seat of claim 4, wherein the second angle is no greater than 30°.

6. The vehicle seat of claim 3, wherein the first portion has a first depth perpendicular to the first impact plane and the second portion has a second depth parallel to the second impact plane, the second depth rearwardly extending from the vertical reference plane.

7. The vehicle seat of claim 6, wherein the second depth is greater than the first depth.

8. The vehicle seat of claim 7, wherein the second depth is at least twice as great as the first depth.

9. The vehicle seat of claim 3, wherein the first and second portions of the airbag have an L-shape.

10. The vehicle seat of claim 1, wherein the first portion upwardly extends from the second portion.

11. The vehicle seat of claim 1, wherein the at least one shape defining member include the first internal tether and a second internal tether, the first internal tether having the first end attached to the skin of the airbag proximate the intersection between the first and second impact surfaces and the second end attached proximate the housing and below the inflator, the second internal tether having a first end attached to the skin of the airbag proximate the intersection between the first and second impact surfaces and a second end attached proximate the housing and above the inflator.

12. The vehicle seat of claim 1, wherein the airbag has a chambered structure defined by internal devices selected from a group consisting of internal tethers, "zero length" tethers, and non-inflated regions.

13. The vehicle seat of claim 1, wherein the first portion downwardly extends from the second portion.

14. The vehicle seat of claim 1, wherein the airbag further includes a third portion having a third impact surface defining a third impact plane, the third impact plane oriented generally vertical, the first portion upwardly extending from the second portion, the third portion downwardly extending from the second portion, the first, second and third portions cooperate to define a T-shape.

15. A vehicle seat comprising:
a seatback having a front side and a rear side;
an airbag unit including an airbag and an inflator, the airbag unit carried by the seatback and including a first portion and a second portion, the airbag, in an inflated state free of outside forces, rearwardly extending from the rear side of the seatback such that the first portion includes a first impact surface defining a first impact plane and the second portion includes a second impact surface defining a second impact plane, the first impact plane oriented generally vertical and the second impact plane oriented generally horizontal; and
at least one shape defining member for maintaining the generally horizontal orientation of the second impact plane,
wherein the first impact plane and a vertical reference plane enclose a first angle,
wherein the first angle is no greater than 30°,
wherein the first portion has a first depth perpendicular to the first impact plane and the second portion has a second depth parallel to the second impact plane, the second depth rearwardly extending from the vertical reference plane.

16. A vehicle seat comprising:
a seatback having a front side and a rear side;
an airbag unit including an airbag and an inflator, the airbag unit carried by the seatback and including a first portion and a second portion, the airbag, in an inflated state free of outside forces, rearwardly extending from the rear side of the seatback such that the first portion includes a first impact surface defining a first impact plane and the second portion includes a second impact surface defining a second impact plane, the first impact plane oriented generally vertical and the second impact plane oriented generally horizontal; and
at least one shape defining member for maintaining the generally horizontal orientation of the second impact plane,
wherein the first portion downwardly extends from the second portion.

* * * * *